United States Patent [19]
Harding et al.

[11] Patent Number: 4,499,510
[45] Date of Patent: Feb. 12, 1985

[54] PRECISION ALIGNMENT SYSTEM FOR INFORMATION STORAGE DEVICES

[75] Inventors: Philip A. Harding, Rancho Palos Verdes; Leonard Schupak, Irvine, both of Calif.

[73] Assignee: Weltec Digital, Inc., Anaheim, Calif.

[21] Appl. No.: 404,749

[22] Filed: Aug. 3, 1982

[51] Int. Cl.³ .......................... G11B 5/58; G11B 21/10
[52] U.S. Cl. .......................................... 360/77; 360/78
[58] Field of Search ..................................... 360/77, 78

[56] References Cited

U.S. PATENT DOCUMENTS

| | | | |
|---|---|---|---|
| 3,977,024 | 8/1976 | Haneji et al. | 360/78 |
| 4,136,365 | 1/1979 | Chick et al. | 360/78 |
| 4,157,577 | 6/1979 | Porter, Jr. et al. | 360/77 |
| 4,378,519 | 3/1983 | Duvall | 318/608 |
| 4,395,742 | 7/1983 | Ostroff | 360/78 |
| 4,445,153 | 4/1984 | Fujimoto et al. | 360/77 |

OTHER PUBLICATIONS

IBM Technical Disclosure Bulletin, vol. 20, No. 5, Oct. 1977, pp. 1893-1896, Multitracks Per Inch Actuator-/Accessing Arrangement, T. M. Paska.

Primary Examiner—George G. Stellar
Attorney, Agent, or Firm—Finnegan, Henderson, Farabow, Garrett & Dunner

[57] ABSTRACT

A method is disclosed for accurately registering read-write heads on a magnetic storage medium. It includes the steps of ascertaining fractional departures of track locations from the nominal locations; providing a control for a motor connected to move a read-write head capable of detecting and storing fractional values of the nominal channel spacing; and coupling the control digitally to a stepping motor or servomotor so as to drive the read-write head accurately to the actual position of any selected track. Also, apparatus for practicing the method, various apparatus being disclosed.

9 Claims, 9 Drawing Figures

PRECISION ALIGNMENT SYSTEM FOR INFORMATION STORAGE DEVICES

SUMMARY OF THE INVENTION

Our invention relates to precise and controllable positioning systems. It is applicable to accurate location of a read and write head which cooperates with a magnetic digital information storage medium. Particularly, it is highly advantageous in overcoming problems of accurate registration of the head with concentric tracks on a flexible disk recording medium.

Such a disk may have 96 tracks to the inch on each side. It is rotated at constant speed. A head on each side of the disk is movable radially of the disk for selection of the desired information storage track. Precise alignment of the head with any selected track is needed to assure accurate information transfer to or from the disk.

A preferred mode of setting the position of the head relies upon an electric motor of a step-by-step type, which will be referred to as a stepping motor. Sequential energization of phases of a multiphase field winding of such a motor causes the armature of the motor to move one step at a time. The motor is mechanically connected to a head traversing mechanism so that each step moves the head the nominal distance from one track to the next. Under digital control, the motor may be directed to take the correct number of steps to reach any track.

This basic system is, obviously, inflexible. The actual location of a track may differ from its nominal location sufficiently to prejudice accurate information transfer. A salient cause of such discrepancies is expansion and contraction of the disk due to changes of temperature and humidity. Also, if a disk is transferred between machines, there may be differences in track locations.

Another disturbing factor is that available stepping motors do not ordinarily provide precisely equal steps, because of tolerances in pole dimensions and windings. Moreover, there may be some non-linearity or hysteresis in the drive from the motor to the head.

Our invention solves such problems by providing for fractional step movements of the motor and by checking the actual position of each track (or sufficient representative tracks), and storing information of the actual locations for use in controlling the motor.

The nature of the invention will be clear to those skilled in the art from the following detailed description of preferred embodiments.

THE DRAWINGS

DETAILED DESCRIPTION

Figure 1:
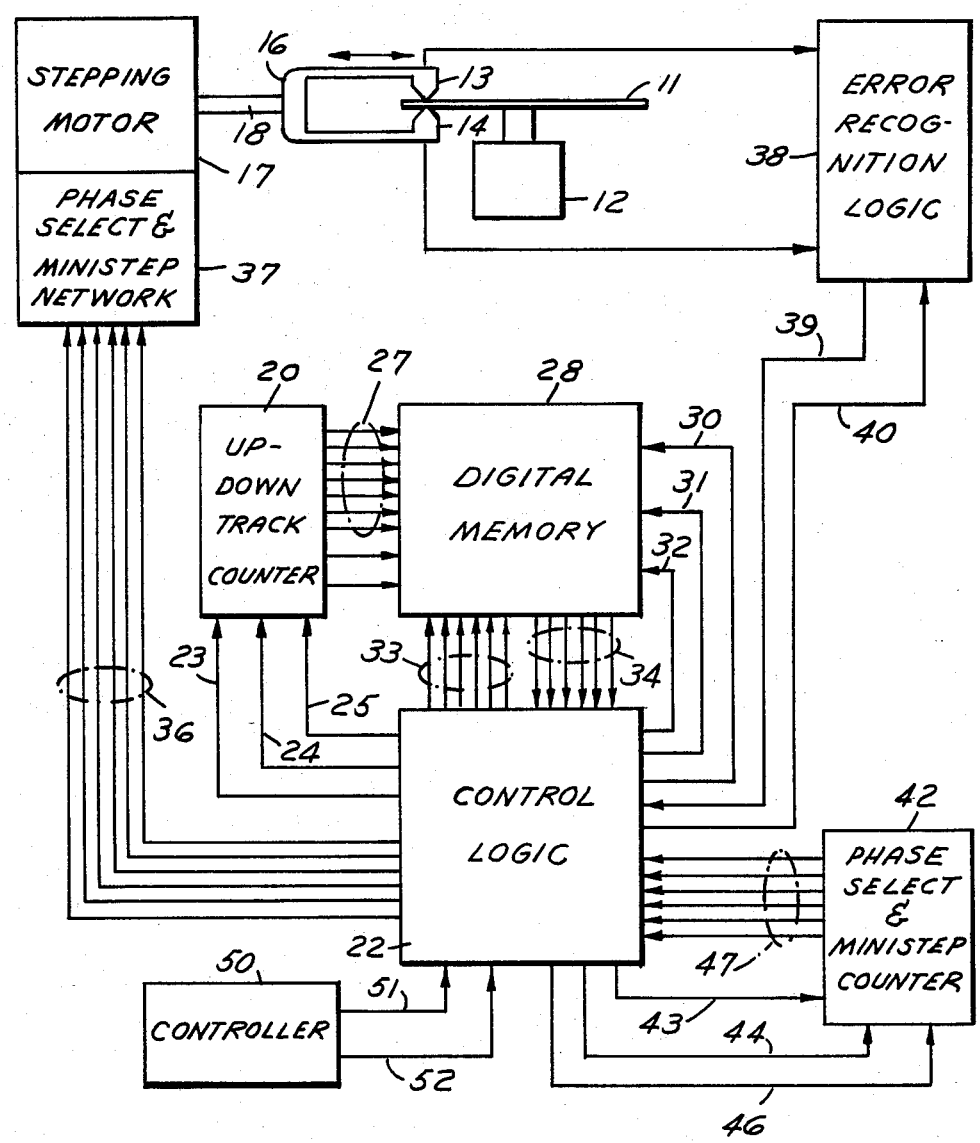
FIG. 1 is a block diagram of the head positioning control system.

Referring to FIG. 1, a block diagram is illustrated of a flexible disk or "diskette" memory system incorporating our invention. The invention is described here as an improvement to a known commercial memory device manufactured by the Remex Division of Ex-Cell-O Corporation, Irvine, Calif., and identified as "Flexible Disk Drive Model RFD 960." It is, of course, applicable to other systems, as will be seen.

In this machine, the diskette 11 is rotated at a constant speed by a motor 12. The diskette has two magnetizable faces which are written on and read from by two heads 13 and 14. These heads are movable radially of the disk to align with any of 80 tracks on each side of the disk by a supporting structure 16 moved by a stepping motor 17. Details of the mechanical linkage 18 between motor 17 and the read-write heads are immaterial here. The heads 13 and 14 move concurrently through a range of 80 tracks per side, spaced 96 tracks to the inch on each side.

An up-down track counter 20, which is provided to recognize the 80 tracks, can be reset, stepped up, or stepped down under command of the control logic 22. This is effected through lines 23 (step up), 24 (reset) and 25 (step down). The state of this counter is fed through seven lines 27 (for 7 binary digits) to a digital memory 28 to provide an address for each recording of the exact radial position of a track on the diskette. These recordings are in the form of a six-bit word for each of the 80 track addresses.

Figure 2:
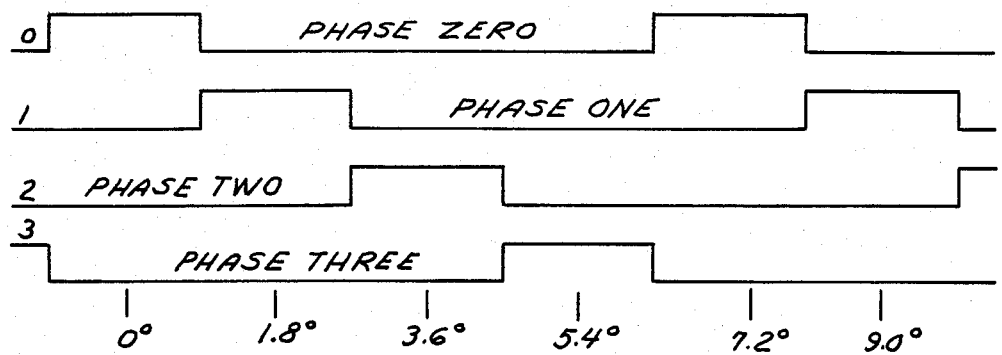
FIG. 2 is a graph illustrating conventional energization of a 4-phase stepping motor.

The reason for the six-bit word can be be explained with reference to FIGS. 2 and 3. FIG. 2 illustrates the operation of a four-phase stepping motor having a range of 200 steps of 1.8°. Phases 0, 1, 2, and 3 may be sequentially energized in that order to step the motor in one direction, or in the reverse order to step the motor in the opposite direction. The mechanical coupling is such that each 1.8° step moves the read-write heads 1/96 inch, equal to one track space. The instructions to energize the motor phases can be carried by two binary digits, but this conventional setup does not allow for controlled variation of the steps.

Our invention involves modulating the effective current to the windings (by magnitude or duration) so that adjacent phases have complementary values of energization. Specifically, we preferably provide 16 steps from zero to 15, since this number of ministeps is the maximum that can be controlled by four binary digits. This gives very precise control of head position. Each mini-step is approximately 1/16 of 1.8°, or 0.12°. At zero degrees phase zero is a maximum, phase one is zero. As phase zero decreases to zero, phase one rises to its maximum. This proceeds cyclically as indicated in FIG. 3. Phase zero begins to increase from zero and phase three to decrease from a maximum at 5.4°, and so on. When a track is exactly located, the motor angle corresponding to its location may thus be expressed by six binary digits—two to select phases, and four to control the complementary energy levels of the active phases to add or subtract one or more ministeps. The manner in which these exact locations are determined will be passed over for the present.

Memory 28 receives its read, write, and gate commands from the control logic 22 through lines 30, 31, and 32. The control logic records the six digit mini-step counter state in memory when it recognizes optimum head alignment. These are fed through lines 33. During the normal read-write mode of the machine, the contents of the memory are read through lines 34 and gated through the control logic 22 and lines 36 to a phase select and mini-step network 37 which controls the stepping motor 17. Several means of effecting this control will be explained.

The error recognition logic 38 is an element found in most disk controllers and need not be explained in detail. It receives signal inputs from the reading heads 16 and 17, recognizes the track and sector number, and carries out an error check after the drive has settled on the track. The result of the error check is transmitted to the control logic through line 39. A settling time and head select logic signal is fed to the error recognition logic 38 through line 40.

The phase select and mini-step counter 42 is a six-bit counter controlled by the control logic 22. It is employed in the calibration and alignment mode of operation in which the location of each track is found. This location is then transferred to the digital memory 28. Counter 42 is connected to the control logic by reset line 43, step up line 44, step down line 46, and six binary digit lines 47. Counter 48 may be read out into memory 28 through lines 47, control logic 22, and lines 33. The value in memory 28 may be read into network 37 (to access any track) through lines 34, logic 22, and lines 36.

The control logic 22 has two major modes of operation, normal and align, which may be selected manually by a front panel switch or automatically. In the normal mode, it receives step commands from an external controller 50 over step up line 51 and step down line 52. It transmits step up or step down commands through lines 23 and 24 to counter 20. This identifies the track, the exact location of which is read, as stated above, into the stepping motor control network 37 to move the read-write heads.

The automatic alignment mode of the control logic is more complex. It is employed when the diskette 11 is first inserted, or after a request for realignment, to insert the step and mini-step values for each track into the memory 28.

Figure 4:
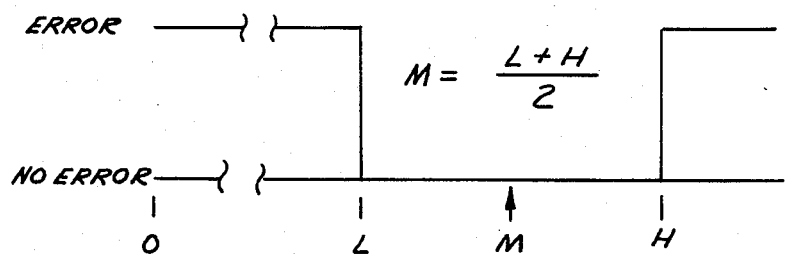
FIG. 4 is a graph illustrating determination of optimum phase select and mini-step counter states.

The basic idea of the procedure involves hunting or scanning to locate the tracks precisely in terms of phase and mini-step instructions to the motor 17. Referring to FIG. 4, if we assume the head is moved from zero position past the track location, there will be readout errors if the head is too far from exact registration with the track. As illustrated, below a value L (for low) and above a value H (for high) of head position there will be readout errors. The desired head position, indicated as M, is the mean of L and H.

The values of L and H may be found by testing readout over a suitable range of values. It should be noted that this may not be done by attempting to move the head by less than approximately a full track to track (one full phase) because of static friction. After each reading, the head is backed off to allow a full step to the next reading point. This is accomplished readily and quickly by automatic control from the control logic.

The procedure may be set out more fully in tabular form as follows:

AUTOMATIC ALIGNMENT MODE

1. Internal clock control set by automatic alignment request.
2. Resets the track counter 20 to "0" state which corresponds to track 0.
3. Resets the phase select and mini-step counter 42 to zero. At zero, this counter should be more than one full step away from its optimum track 0 location to allow for off-track tolerances and to allow the stepping motor to have driving forces sufficient to overcome friction when moving to its selected mini-step.
4. The control logic gates the phase select and mini-step counter state to the step motor network 37 for proper actuation.
5. Hunts for correct track location by:
    a. Advancing the phase select counter 42 to state n where n is sufficiently large to overcome friction.
    b. Complete an error check from error recognition logic 38. If there is no error, then the phase select counter must be reset to zero and re-advanced to n minus 1.
    c. The phase select counter states are continually altered as in a and b, one count at a time, until the first location is selected at which an error occurs. This state is called "L" (see FIG. 4)).
    d. If the initial error check indicated an error at mini-step n, then the counter is reset to zero and advanced to n+1 for a subsequent error check. The mini-step counter continues to be advanced until the first location of no error is indicated. This location is called "L+1".
    e. After L or L+1 is located, the counter is continually altered by resetting to zero and then subsequently advancing to higher states until the first location is selected at which an error reoccurs. This is called "H".
    f. The proper phase select count for recording in memory is midway between the L and H locations and is called "M".
6. The control logic records the value of M into the memory at the selected track counter address.
7. The track counter is advanced to state 1 and the mini step counter is advanced by 16.
8. The hunt operation is renewed at track counter state 1 and the next optimum mini-step is recorded into memory at address 1.
9. This operation is continued on all subsequent track counter locations with the hunt carried out and proper mini-step count recorded until all tracks have been monitored.

To complete the description of the block diagram, FIG. 1, it shows two optional lines from the counter 20 into the memory 28. A line 54 may select head 13 or head 14. Line 55 signals a step up or down.

This brings us to the phase select and mini-step network 37 (hereinafter network 37) which coacts with motor 17 to cause the desired translation of the read-write heads 13 and 14. We have devised several systems.

Figure 5:
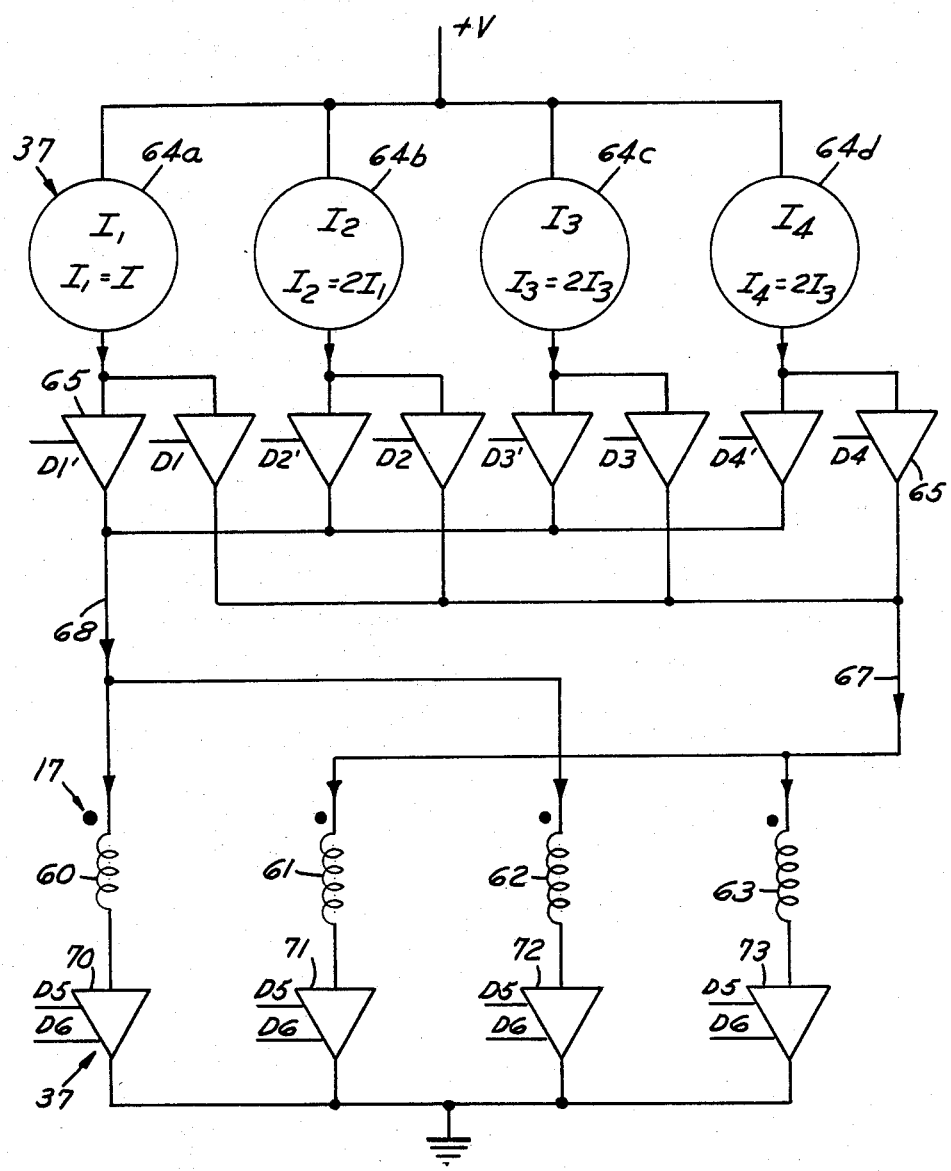
FIG. 5 is a phase and mini-step selection circuit in the control system of FIG. 1.

FIG. 5 illustrates a switched digital to analog unidirectional current arrangement. In this, network 37 includes four binary weighted constant current sources, 64a, 64b, 64c, and 64d of current values I, 2I, 4I, and 8I as indicated, which are used to drive the four step motor windings, phase 0, phase 1, phase 2, and phase 3, of motor 17, identified as 60, 61, 62, and 63. Possible sums of these currents range from zero to 15I as illustrated in FIG. 3. Eight steering switches 65 which are activated by input logic signals D1', D1, D2', D2, D3', D3, D4', and D4 are used to direct the constant current sources so that binary weighted summations are obtained in the phase windings. (DJ' is the logic complement of DJ.) The network of the four constant current sources and the steering switches 65 comprise a digital-to-analog current source in which the odd phase current in line 67 and the even phase current in line 68 always add to the sum 15I. This arrangement essentially develops the current relationships shown in FIG. 3. Four additional switches 70, 71, 72, and 73 in network 37 direct the even phase and odd phase currents into the motor phase windings so that two adjacent windings receive currents at the same time; one receives even phase and its neighbor receives odd phase. The logic shown in FIG. 5 requires that the phase select and mini-step counter bits D1 through D4 be advanced in the following sequence:

0, 1, 2 . . . 14, 15, 14, 13 . . . 2, 1, 0, 1, 2, . . .

Figure 3:
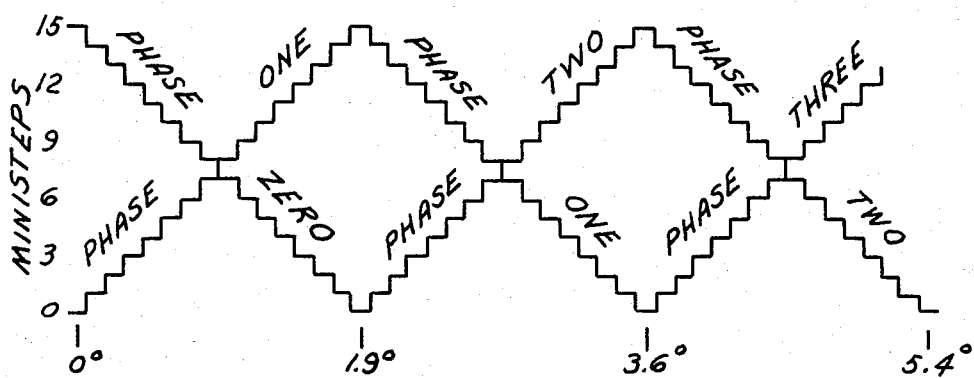
FIG. 3 is a graph illustrating energization to provide 16 mini-steps over the range of each conventional step.

This scheme allows the step motor to increase its angular displacement from a reference location as the counter bits are altered, as illustrated in FIG. 3. The bits D5 and D6 should be consecutively sequenced so as to energize the phase windings 60, 61, 62 and 63 of the stepping motor, as shown in FIG. 2.

Figure 6:
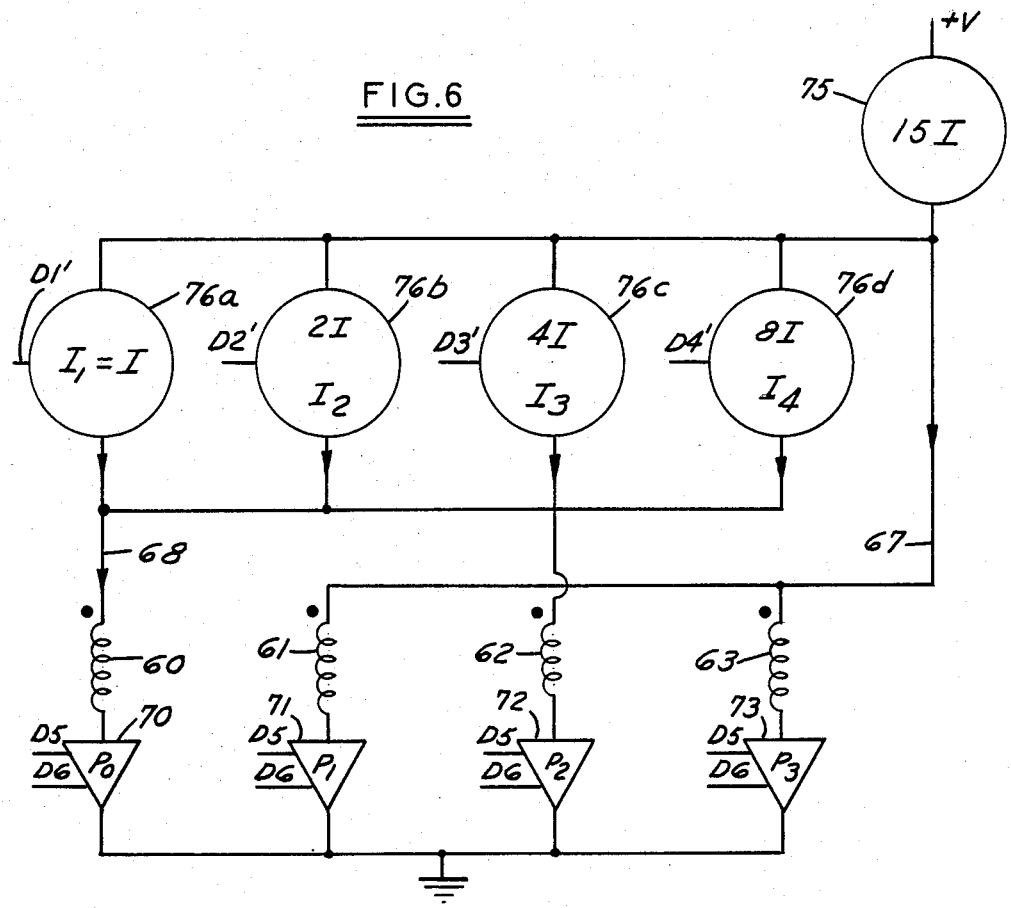
FIG. 6 is another embodiment of a phase and mini-step selection circuit suitable for use in the control system of FIG. 1.

FIG. 6 illustrates a scheme similar to the circuit shown in FIG. 5. However, the four constant current sources 64a to 64d and eight steering switches 65 are replaced by four binary weighted current sources 76a to 76d and a constant current source 75. The currents from 76a to 76d are activated by the identical logical inputs D1' D2', D3' and D4' as in FIG. 5 and are summed to form "I even phase" which is directed through line 68 into Phase 0 and phase 2 as in FIG. 5. "I odd phase", developed as the difference between 15I and I even phase, is directed through line 67 into phase 1 and phase 3.

Figure 7:
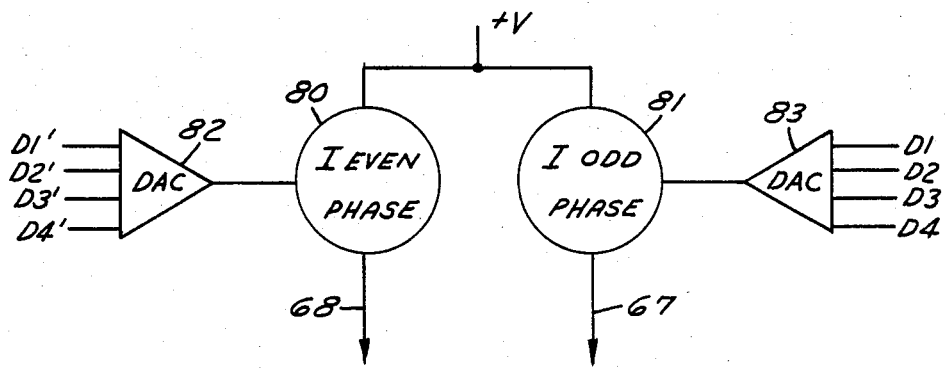
FIG. 7 is another embodiment of a phase and mini-step selection circuit for use in the control of FIG. 1.

FIG. 7 illustrates an alternative arrangement which replaces the current sources and steering switch networks of FIGS. 5 and 6 with two current sources 80 and 81 whose amplitudes are determined by two four-bit digital to analog converters 82 and 83. The I even phase DAC amplitude is determined by D1', D2', D3' and D4' whereas the I odd phase DAC amplitude is determined by the complementary logic signals D1, D2, D3, and D4; consequently, I even phase plus I odd phase are a constant as required. All other logic signals remain the same as in FIGS. 5 and 6, and the remainder of the circuit is as shown in those figures.

Figure 8:
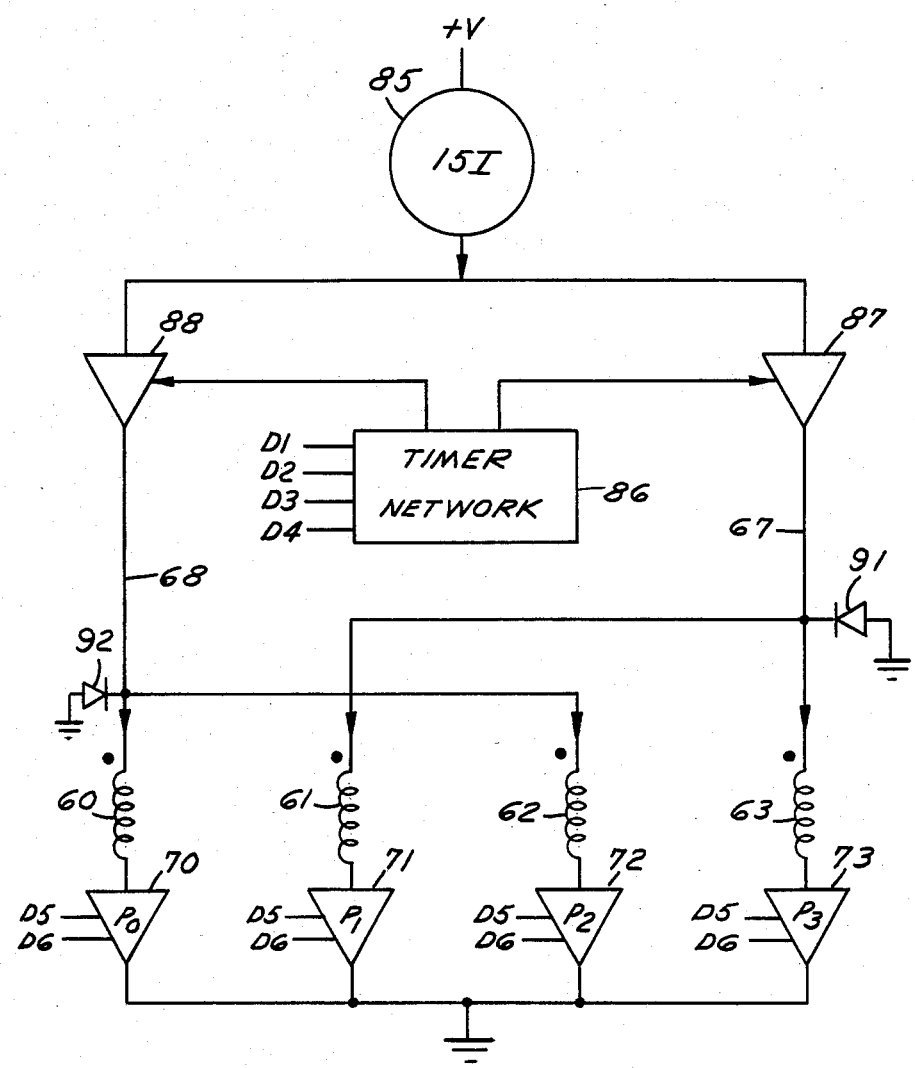
FIG. 8 is a phase and mini-step selection circuit with time division switches.

A quite different approach involving variably timed pulsed currents is illustrated in FIG. 8. In this approach a single constant current source 85 is steered through two time division switches 87 and 88 controlled by a timer network 86 to generate the appropriate binary weighted currents, with the remainder of the network unchanged. Lines 67 and 68 are energized for complementary portions of the cycle time T. Each line is energized for some number of fifteenths of T from 0 to 15/15 or 1. The frequency, I/T, is chosen to be significantly less than the information frequencies coming off the diskettes to be non-interfering but sufficiently higher than the fastest step rate of 333 steps/second that the actuator will not vibrate. The sum of T1 plus T2 equals T but each is varied to generate binary weighted average currents. Lines 67 and 68 are grounded through diodes 91 and 92 to bleed off negative potentials on these lines.

Figure 9:
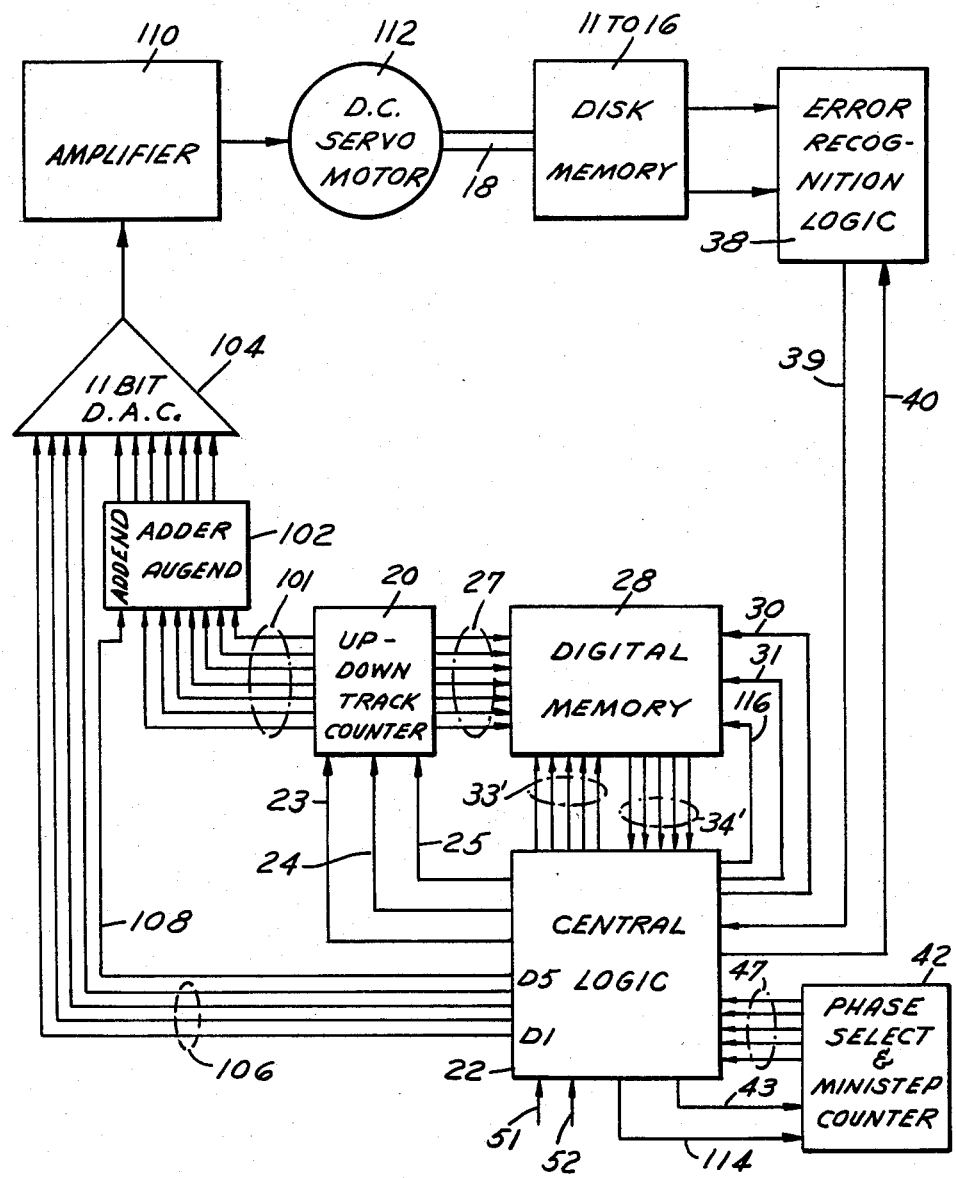
FIG. 9 is a block diagram of an embodiment of a head positioning control system employing a servomotor controlled by a digital-to-analog converter.

An alternative approach to the use of mini-step digital information to locate the read-write head involves the use of an open-loop DC servomotor. FIG. 9 is a block diagram of such a system. As will be apparent, there is a great deal of similarity between this system and that of FIG. 5. Where applicable, the same reference numbers are used on FIGS. 9 and 5, and the description will concentrate on the differences between the two in the interest of brevity. The mini-step counter 42 and memory 28 have been reduced from 6 to 5 bits. Line groups 33', 34', and 47' are therefore of five rather than six lines. Seven bits identifying the nominal track location are fed from the up-down track counter 20 through lines 101 and an adder 102 to an 11-bit digital-to-analog computer 104. The 4 lowest information bits, defining 16 ministeps per track spacing, are transmitted from the digital memory 28 via the control logic 22 directly to computer 104 through lines 106. The fifth significant bit is fed from the digital memory through the control logic and line 108 to the lowest digit input of adder 102, where it provides the addend for possible correction of the higher digits transmitted to the computer 104. During alignment modes, lines 106 and 108 are controlled by the phase select and mini-step counter 42, as in the system of FIG. 1.

The 11-bit computer 104 is effective to direct the servomotor to 80 tracks time 16 ministeps per track or 1,280 locations. The computer is coupled through an amplifier 110 to the D.C. servomotor 112, which drives through the mechanical transmission 18 to set the read-write heads of the disk memory 11–16.

We may note a few changes in this system from that of FIG. 1. Line 114 is a "count" line. Line 116 is a "clock" line. Some lines are omitted.

The control logic 22 records the optimum mini-step state into the digital memory 28 by recognizing the midpoint of "no error" regions from the error recognition logic 38 as before. The adder 102 is used to adjust the track address by the optimum mini-step to locate the head carriage assembly to the best track position. This scheme has benefits in addition to those stated for the circuit of FIG. 1.

A DC servomotor is less expensive than a stepping motor.

The step-to-step delays are eliminated, since the servo can be directed to its ultimate position without waiting for the drive to step through each track. This benefit could speed up the drive access time significantly.

The audible noises in flexible drives would be significantly reduced because the step-to-step actuation is eliminated along with the inherent stepping motor oscillations.

Much of the circuitry in the disk controller converts digital addresses into sequences of pulses. Since the DAC controlled DC servomotor moves directly to the final track it is no longer necessary to generate pulse sequences and track identification field data. Thus, the disk controllers can be simplified as well.

It will be apparent to those skilled in the art that the systems and procedures described herein are highly advantageous in improving the precision and reliability of disk information systems. Also, that these improvements are adapted to use in various environments. This detailed description of preferred embodiments of our invention, for the purpose of explaining the principles thereof, is not to be considered to limit the scope of the invention.

We claim:

1. In a system for controlling read-write head position of a digitized information storage device, the device including a magnetizable medium for recording information in tracks having a predetermined nominal spacing; a read-write head; means for driving the medium so that the head scans the tracks; and motor means for traversing the head for registration with any selected track, the improvement comprising memory means for digitally storing the location of each track in which the least significant digits identify fractional values of the nominal track spacing, and means for controlling the said motor means to traverse the head to optimum registration with any selected track responsive to the said memory means and employing the said least significant digits to control the motor means by fractional portions of the said nominal value.

2. A system as defined in claim 1 in which the motor means is a D.C. servomotor and the means for controlling the motor means includes a digital-to-analog converter responsive to the digits stored in the memory means.

3. A system as defined in claim 1 in which the motor means is a stepping motor having poles magnetized by electric current, and in which the means for controlling the motor means includes means for dividing the current between adjacent poles so that the current to one pole increases in discrete steps as the current to an adjacent pole decreases in corresponding discrete steps.

4. A system as defined in claim 3 in which the means for controlling the motor means includes plural current sources in binary digital relationship, means for selectively directing the outputs from said sources to a motor pole, and means for directing the complement of the said outputs to a second motor pole.

5. A system as defined in claim 3 in which the means for controlling the motor means includes a constant current source connected to a motor pole and digitally controlled means for diverting binary digital fractions of the output of the constant current source to an adjacent pole.

6. A system as defined in claim 3 in which the means for controlling the motor means includes a first digital-to-analog converter responsive to stored bits effective to control current to a motor pole and a second digital-to-analog converter responsive to the complements of the stored bits effective to control current to an adjacent pole.

7. A system as defined in claim 3 in which the means for controlling the motor means includes a constant current source and means responsive to stored bits to direct the current from the source alternately during repeated cycles to adjacent motor poles, with the current to each pole being maintained for a binary digital fraction of the cycle time.

8. A method of controlling read-write head position of a digitized information storage device employing a magnetizable medium on which information is recorded in tracks having a predetermined nominal track spacing and in which the head is traversed over the medium by a motor so coupled to the head that a full step of the motor equals one nominal track space, the method comprising controlling the motor by digital signals including digits representing fractions of a full step of the motor so as to position the head selectively at mini-step locations of the head intermediate the nominal track locations; testing actual track locations by readout from the medium over a range of ministeps; digitally storing the mini-step value of location of each track; and controlling the motor by the stored values to register the head with a selected track for read-write operation.

9. A method of controlling read-write head position of a digitized information storage device employing a magnetizable medium on which information is recorded in tracks having a predetermined nominal track spacing and in which the head is traversed over the medium by a stepping motor so coupled to the head that a full step of the motor effected by change in energization of a pole between zero and full current steps the head one nominal track space, the method comprising delivering reversely varying values of current to adjacent poles, the said values having a constant sum and being varied in digital fractions of the maximum value so as to determine mini-step locations of the head intermediate the full step locations; testing actual track locations by readout from the medium over a range of mini-steps; digitally storing the mini-step value of location of each track; and controlling the motor by the stored values to register the head with a selected track for read-write operation.

* * * * *